United States Patent

[11] 3,631,292

[72] Inventor Merton H. Crowell
Morristown, N.J.

[21] Appl. No. 860,271
[22] Filed Sept. 23, 1969
[45] Patented Dec. 28, 1971
[73] Assignee Bell Telephone Laboratories, Incorporated
Berkeley Heights, N.J.

[54] IMAGE STORAGE TUBE
16 Claims, 4 Drawing Figs.

[52] U.S. Cl. ........ 315/10
[51] Int. Cl. ........ H01j 31/26
[50] Field of Search ........ 315/10

[56] References Cited

UNITED STATES PATENTS

| | | | |
|---|---|---|---|
| 3,403,284 | 9/1968 | Buck et al. | 315/10 |
| 3,440,476 | 4/1969 | Crowell et al. | 315/10 |
| 3,419,746 | 12/1968 | Crowell et al. | 315/10 |
| 3,523,208 | 8/1970 | Bodmer et al. | 315/10 |

*Primary Examiner*—Rodney D. Bennett, Jr.
*Assistant Examiner*—N. Moskowitz
*Attorneys*—R. J. Guenther and Arthur J. Torsiglieri

ABSTRACT: Bandwidth limitations in some video systems (e.g., those employing telephone transmission lines) prohibit the transmission of high-resolution video with the normal frame interval. One proposal for overcoming this is to extend the frame period. Although moving subjects cannot be televised in this way the proposal is quite adequate for transmitting documents. The convenient way to implement this proposal is to use a slow scan rate in the camera. However, conventional cameras are not made with sufficient storage duration to allow slow scan rates. The specification describes a video camera with a novel mode of operation to give extended storage capability.

PATENTED DEC 28 1971 3,631,292

INVENTOR
M. H. CROWELL
BY
ATTORNEY

IMAGE STORAGE TUBE

This invention relates to a video pickup system for converting optical images to video signals. The system employs an image storage tube which is especially adapted for long duration storage and/or slow scan readout.

In some special video applications bandwidth limitations and other transmission consideration make it necessary to transmit the information in a single frame over a period longer than the usual readout scan time. For example, if picture resolution is to be increased and the transmitting bandwidth is fixed the transmitting rate must be extended. A fourfold increase in linear picture elements requires $4^2$ times the transmission time, changing the familiar one-thirtieth second frame time to approximately one-half second. Situations can exist where the receiving station further limits the transmission rate. For example the receiver may be a data processor or duplicator that requires a slow input. All of these applications require that the image be reliably stored during the relatively long readout period. Alternatively the image can be stored for later interrogation at either fast or slow readout rates.

Thus there is a need for a high performance optical storage tube in which the image can be stored without degradation for periods of several seconds.

This invention is directed to a system employing such a storage tube which can be operated with a slow scan readout or a delayed slow scan or normal scan readout. The storage tube incorporates the usual electron beam scanning means. The target comprises a dielectric layer upon which the optical image is stored. In accordance with the invention the image can be made stable for time intervals of from several seconds to many hours, the upper limit depending upon the vacuum conditions and the number of ions resulting from residual gas pressure in the tube.

In one preferred embodiment the storage device employs a target incorporating a silicon diode array similar to that described in U.S. Pat. No. 3,403,284, issued to T. M. Buck—M. H. Crowell—E. I. Gordon on Sept. 24, 1968 and U.S. Pat. No. 3,419,746, issued to M. H. Crowell—J. V. Dalton—E. I. Gordon—E. F. Labuda on Dec. 31, 1968. Camera tubes with this improved target have proved highly effective when compared with prior art devices in terms of spectral response, quantum yield, and image lag. However, when these improved tubes are operated at slow scan rates, i.e., several seconds, the dark current impairs the performance of the tube. Specifically, typical silicon diode array camera tubes have a room temperature dark current of the order of 5–20 nAmp. with a dynamic range of the order of 500 nAmp. using the conventional frame period of one-thirtieth second. Thus it is evident that the dark current will constitute the entire dynamic range of the tube if the frame period is 3 seconds (this assumes the lowest dark current value). The dark current can be reduced by cooling the target but this is an undesirable solution at best and is only partially effective since the wide spectral response of the target makes it sensitive to the infrared radiation from the electron gun.

If the silicon diode array target is provided with an insulating charge storage layer and is operated with a sequence of priming, write, fix, readout operating modes (as explained more fully below) the dark current of the diode array no longer degrades the stored image since the charge pattern is now electrically isolated from the diode array.

An alternative embodiment employs the dielectric storage layer in combination with a photoresponsive semiconductor layer with an auxiliary mechanism for limiting lateral conduction of the stored charge. (Image resolution depends on localized isolation of the minority carriers produced by photon absorption.) Since this function is ordinarily carried out by the diodes, the diode array can now be eliminated. Briefly described, the carriers generated by optical absorption diffuse to the semiconductor insulator interface and can be fixed thereby storing an equivalent but opposite charge on the insulator. The dipoles thus created will remain fixed in a lateral position until the charge pattern on the insulator surface is interrogated.

These and other aspects of the invention perhaps will be more readily understood when considered in the light of the following detailed description.

Figure 1:
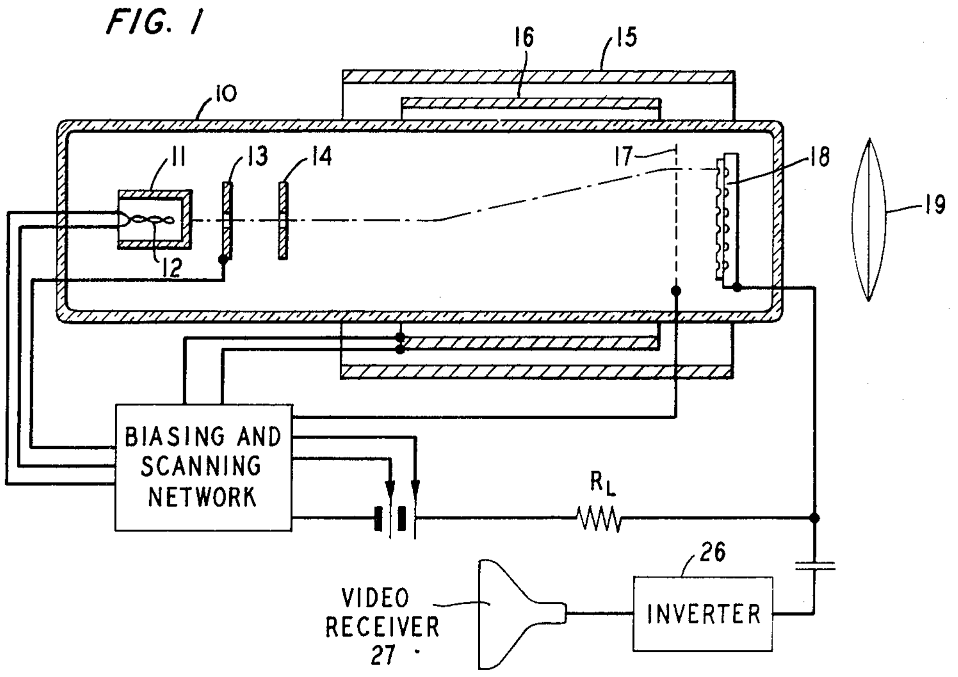
FIG. 1 is a schematic representation of a video pickup system embodying the principles of the invention.

Referring to FIG. 1, there is shown a schematic representation of a video pickup system employing a specially adapted electron beam camera tube. Referring to the detail of the camera tube, the structure and operation of the electron beam forming and scanning means is conventional. The tube envelope 10 is evacuated and encloses, at one end, the electron beam forming and scanning means. This comprises, in a simplified case, a cathode 11, cathode filament heater 12, accelerating anode 13, and a beam forming aperture 14. A beam focusing coil 15 and a beam deflecting coil 16 comprise the scanning means. A collector electrode 17 in the form of a wire grid or mesh is provided adjacent to the target for collecting secondary electrons from the target surface. The target 18 occupies the usual position so as to receive the scanning beam as well as optical information focused through the end of the tube by the optical lens system shown here simply as lens 19.

Figure 2:
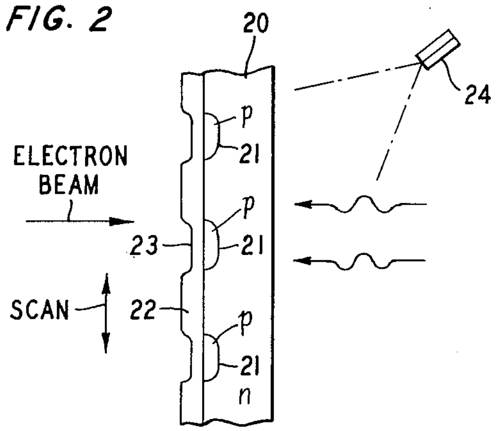
FIG. 2 is a side elevation view, in section, of the target element of the storage tube of FIG. 1.

One embodiment of the target 18 is shown in detail in FIG. 2. The target structure, and indeed the structure of the entire camera tube, will be recognized as resembling the corresponding structures of prior art camera tubes but the mode of operation of the system is quite unique. The target comprises a semiconductor substrate 20 with a monolithic array of diffused regions 21 formed in one side thereof. In this version the diffused regions are of a conductivity type opposite to that of the substrate so as to form an array of PN-junction diodes. Alternatively, operating in the mesh stabilized mode would permit N-type regions on a P-type substrate. This complementary structure is described more fully in U.S. Pat. No. 3,403,284. An insulating layer 22 is formed over the diode array except that, as indicated at 23, the portions of the insulating layer that cover the diodes have a reduced thickness. The direction of the incident electron beam and the scan direction are evident from the arrows in FIG. 2. The optical image is incident on the other side of the target as shown.

A functional description of a diode array target camera tube and some details of its construction are given in the aforementioned U.S. Pat. Nos. 3,403,284 and 3,419,746. In a preferred embodiment the diode array is formed into a $\approx 10\Omega$ cm. N-type silicon substrate having a thickness in the range of $5\mu$ to $50\mu$. The diodes are $5\mu$ to $10\mu$ in diameter on center-to-center spacings of $15\mu$ to $30\mu$. A convenient arrangement uses $8\mu$ diodes on $20\mu$ centers. The insulating layer 22 is $SiO_2$ and the thin regions 23 have a thickness of the order of 100 to 5000A while the remaining layer is typically more than 5000A normally of the order of $1\mu$. The insulating layer can be produced quite simply using a two-step oxidation procedure.

TARGET OPERATION

The writing mode is performed on a target prebiased to give a potential on the surface of the insulating layer 23 but with essentially no bias on the diodes. The manner of achieving this prebias condition will be explained later. It is helpful in this discussion to speak of actual voltage values although the values given are to be considered as exemplary of a broad range of specific operating values. The overall mode of operation, that is, the sequence of steps and the functional results, are characteristic of the invention.

Assume the bias on the surface of the insulating layer to be $\mp 15$ volts. The bias on the diodes is zero and the target substrate 20 is at ground through a load resistor of $\approx 5K\Omega$. The bias condition on the insulator creates an accumulation region in the substrate beneath the thick portions of the oxide. The cathode of the electron gun is then biased to +5 volts and the insulating layer is scanned with the beam. This charges the insulator to +5 volts and reverse biases the diode array by approximately 8 volts. This bias is slightly less than the apparent 10 volt bias (+15 initial minus scanning voltage) due to an assumed 4 to 1 capacitive division between the oxide over the P-regions and the junction capacitances. It is important to recognize that reverse bias on the diode array is thus achieved without depleting the $Si-SiO_2$ interface between the diodes. The diode array is now photosensitive and the optical information is imaged on the target as indicated in FIG. 2. The minority carriers produced in the semiconductor substrate region as the result of photon-generated hole electron pairs diffuse to the biased junctions and depolarize each junction in proportion to the localized light intensity. Ignoring the dark current for a moment this means that diodes in dark regions of the image will retain a −8-volt bias while regions exposed to maximum light will be depolarized completely, thus giving a dynamic range of 8 volts. After the integration period (which may be as long as 1 second or as short as the optical system permits but is usually of the order of a normal frame period) a charge pattern will remain which is a replica of the optical image. Thus oxide regions over diodes having maximum light exposure will be at +13 volts and the oxide surface over nonilluminated diodes will remain at +5 volts. Thus there is established a static electric voltage pattern on the insulator which pattern is a replica of the optical image. The electron beam is again scanned over the target with the cathode held at +5 volts. This charges the oxide surface over the illuminated diodes from +13 to +5 volts without affecting the oxide over the nonilluminated diodes. This charging over the illuminated diodes will create a junction bias of 6.4 volts (due to capacitive division) which is 1.6 volts less than the charge on the nonilluminated diodes. The beam is then turned off. The bias on the diodes is now removed affecting the charge pattern in the oxide. This can be achieved in several ways. The most convenient of these is to allow the dark current to spontaneously depolarize the diodes. This merely requires a time interval usually of the order of 1 to 10 seconds (but always at least several times the integrating time) between the scan just described, which may be thought of as the charge pattern fixing scan, and the reading scan that comes later. Alternatively, the residual reverse bias on the diodes can be removed by optical saturation, i.e., by flooding the optical image side of the target with intense light. This can be done in a short time period and is recommended where the overall storage and retrieval time is to be a few seconds or less. An auxiliary light source 24 for this purpose is shown in FIG. 2. The schematic representation is of an electroluminescent diode, a convenient form for this light source. Filament-type flashlamps can be used or the light from the image itself, properly defocused or diffused. As the residual bias is removed from the diodes the voltage on the oxide over the illuminated diodes returns to 11.4 volts while the voltage on the oxide over the nonilluminated diodes is 13 volts. This is the image pattern to be stored and later interrogated. The step of removing the bias on the diodes is important for other reasons. For example the removal of the reverse bias from the diodes renders them insensitive to further light exposure. Thus after the charge pattern is fixed the light side of the target does not require protection from external light. Also, the removal of the bias on the diodes eliminates the effects of dark current. Thus at this point the charge image will be stable for long periods of time.

A further consequence of this mechanism can be the elimination of an optical shutter. For example, if the auxiliary saturating light source is timed to flood the target immediately after the fixing scan, the target can be exposed to additional external light without further integration.

The reading process is substantially conventional. The target is scanned by the beam with the cathode clamped at a positive voltage, e.g., +5 volts. It is important to recognize that since the target at this point is insensitive to light and since there is no dark current at this time, the reading mode can be delayed and the reading scan can be made as slow as the system requires. This achieves one of the principal objectives of the invention.

As the reading scan proceeds, the diodes will again be selectively reverse biased in accordance with the charge pattern on the insulator surface. Thus, after the insulator surface is once interrogated and the surface of the insulator is uniformly charge (in this example to +5 volts) a portion of the original charge pattern can be restored by again flooding the target with light with the beam turned off. It should be remembered that directly after the reading operation the target is again sensitive to light and will also be sensitive to dark current so that if multiple readout of the image is required the sequence must be properly timed. The sequence described above is appropriate for multiple readout.

It should be mentioned that the image obtained by the above technique is a negative image due to the charge reversal inherent in the operational sequence. This means only that the signal must be inverted prior to the video receiver. In FIG. 1 the output from the camera tube is fed to an inverter stage 26 and then to the video receiver, shown schematically at 27.

To prepare the target for a new frame after readout, the initial (+15 volts) potential must be restored to the insulator surface. This "priming" mode is accomplished by pulsing the cathode to a negative voltage having a magnitude sufficient so that the electrons bombard the target with energies above the first crossover (i.e., the secondary emission ratio is above unity). The electron beam can then be used to charge the entire target surface to approximately 20 volts positive with respect to ground. The electron beam can then be used to establish a uniform voltage profile prior to writing by pulsing the cathode to +15 volts and charging the surface to uniform potential. It may be helpful to provide uniform target illumination during the priming operation if rapid cycling is desired.

It should be evident that the function served by the electron beam in each case except the reading function can be served equally well by a flood beam. Flood beams are known in the art and consist usually of unfocused or grossly focused electron beams which expose the whole target or large portions of the target at one time.

Figure 3:
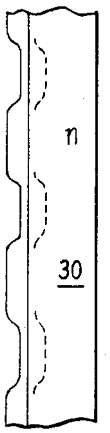
FIG. 3 is a view similar to that of FIG. 2 showing an alternative embodiment of the target element.

An alternative embodiment of the target is shown in FIG. 3. The tube employing this target is conventional, for example, that of FIG. 1. The target itself is similar to that of FIG. 2 except that no PN-junctions are diffused into the base region 30. Depletion regions (indicated by the dashed lines in FIG. 3) will form under the thin insulator regions with the appropriate bias conditions on the insulator. The mode of operation of this device can be the same as that for the target of FIG. 2. The barrier layer accompanying a Schottky barrier is capable of storing charge also so that the Schottky barrier analogue to the PN-diode array will also serve the ends to which this invention is directed. In each of the foregoing cases the target comprises an array of discrete device elements. The reason for selecting such structures is to confine the charge storage to the localized regions where it is produced, that is, to preclude lateral conduction and its attendant impairment of resolution. Thus an array of barrier layer devices effectively quantizes the stored charge in electrically isolated devices.

Figure 4:
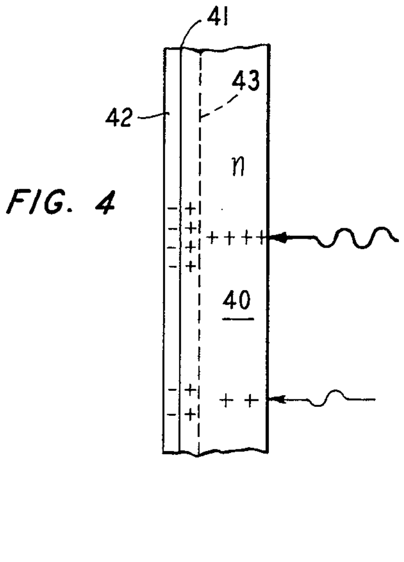
FIG. 4 is a view similar to that of FIG. 2 showing yet another embodiment.

A simpler target structure can be made without relying on an array of discrete devices. Such a structure is shown in FIG. 4. Here an N-type semiconductor substrate 40 is processed to include a single continuous barrier layer 41. Shown here is a layer of insulating material 42 formed on the surface of the semiconductor. Alternatively the barrier layer can comprise a PN-junction. By properly biasing the surface of the insulator in a manner similar to that described for the previous targets, a depletion region 43 forms which collects minority carriers as they are generated by photon absorption. In FIG. 4 two regions are shown schematically exposed to light. The carriers collect locally as shown. This charge could be read in the conventional manner except that, between the beginning of the carrier integration period (writing mode) and the reading scan, lateral conduction of these carriers occurs and the picture resolution is impaired. The lateral conduction problem will be especially acute when the reading mode is delayed or a slow scan reading mode is used. According to one of the novel features of this embodiment the target is exposed to an electron beam while (or shortly after) the charges are being integrated. Electrons from the electron beam will deposit on the surface of the insulator with a spatial pattern which is a replica of the light image. Each electron deposited in this manner creates an electrostatic dipole with its associated hole. This dipole has very limited lateral mobility. Thus the charge pattern of electrons on the insulator is a high resolution pattern of the optical image and has long term stability. The writing mode in this case can be terminated either by annihilating the depletion region or by removing the electron beam. Ultimately both of these steps are taken prior to reading but either separately will terminate optical integration.

The reading mode and priming mode are similar to those previously described.

It is advantageous (but not essential) to use an electron flood beam for creating the dipoles just described. This insures that the charge on all parts of the target is integrated with equal effectiveness.

As pointed out previously, the details of the construction and fabrication of the several target embodiments are known or will be evident to those skilled in the art. However, certain recommendations might be appropriate to assist in the construction of a working embodiment. The semiconductor material is preferably silicon in which the minority carrier lifetime is sufficient for effective integration according to the operation described herein. Modifications in the target thickness and the frame period may permit the use of other semiconductors such as gallium arsenide. Germanium targets are useful for detection of infrared images especially if the target is cooled so as to keep the dark current within tolerable limits. For silicon the recommended target resistivity is approximately 10Ω cm., although resistivities in the range of 0.1Ω cm. to 100Ω cm. can be used. The target thickness depends upon the resolution desired but generally thicknesses of 5$\mu$ to 50$\mu$ are recommended. The diodes may be formed by any known technique. Boron diffusion is well established for this purpose. The insulating layer is preferably $SiO_2$ and can be formed by a two-step oxidation technique.

In the embodiment of FIG. 2 the diode array target can be formed as usual with a light oxidation following the diffusion step. A range of 100A to 5000A is recommended for the thickness of the insulator over the active regions. The passive regions should be at least three times and preferably 10 times this thickness.

The structure described in connection with FIG. 3 can be made in a manner identical to that described in connection with FIG. 2 except that the diffusion step used to form the diodes is eliminated.

Fabrication of the target shown in FIG. 4 is even more straightforward. The entire insulating layer in this is active. An $SiO_2$ layer having a thickness of 100A to 1$\mu$ would be appropriate.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A video pickup system for converting optical images to video signals comprising a camera tube having an evacuated envelope, electron beam forming and scanning means in the envelope, a target in the envelope situated to be exposed on one side to an electron beam, the target comprising a semiconductor body in which hole-electron pairs are generated upon photon absorption of an optical image and an insulating layer covering the surface of the semiconductor body on the electron beam side of the target, means for biasing the surface of the insulating layer to a potential of a first magnitude and then for biasing the surface of the insulating layer to a potential of a second lower magnitude to form a storage region in the semiconductor body beneath the insulating layer, means for focusing the optical image on the target on the side thereof remote from the electron beam side to store minority charge carriers in the storage region in a pattern of the optical image, a charge pattern fixing means including means for again biasing the surface of the insulating layer to the lower potential and means for annihilating the storage region whereby an isolated charge pattern is stored on the surface of the insulating layer which is a replica of the minority charge pattern of the storage region, and reading means for scanning the surface of the insulating layer with a reading electron beam to generate an electrical signal in accordance with the charge pattern stored thereon.

2. A video pickup system for converting optical images to video signals including in combination an image storage tube comprising a target having a semiconductor body of one conductivity type, an array of discrete regions of the opposite conductivity type formed into a first side of the semiconductor body to form an array of PN-junction, an insulating layer covering the first side of the semiconductor body, and electron beam forming and scanning means, the combination further including means for biasing the insulating layer to a potential of a first magnitude and then for biasing the insulating layer to a potential of a second lower magnitude to leave a residual reverse bias on the PN-junctions and form a storage layer for minority carriers adjacent each junction, optical imaging means adapted to expose the side of the target opposite to the first side with an optical image to create minority carriers in the semiconductor body and to store them in the storage layer in a pattern of the optical image, a charge pattern fixing means including means for again biasing the insulating layer to the lower potential and means for annihilating the storage layer whereby an isolated charge pattern is fixed on the insulating layer which is a replica of the charge pattern of the storage layer, and reading means for scanning the target with a reading electron beam to generate an electrical signal in accordance with the charge pattern on the insulating layer.

3. The system of claim 2 in which the semiconductor body of the storage tube is N-type and the discrete regions are P-type.

4. The system of claim 2 in which the semiconductor body of the storage tube is P-type and the discrete regions are N-type.

5. The system of claim 4 in which the semiconductor body of the storage tube is silicon.

6. The system of claim 2 wherein the electron beam forming means comprises an electron flood gun.

7. A video pickup system for converting optical images to video signals including in combination an image storage tube comprising a target having a semiconductor body of one conductivity type, an array of discrete regions of the opposite conductivity type formed into a first side of the semiconductor body to form an array of PN-junctions, an insulating layer formed on the first side of the semiconductor body, the insulating layer having an array of regions of reduced thickness over the discrete regions, and electron beam forming and scanning means, the combination further including means for biasing the insulating layer with a priming electron beam to a positive potential and then for biasing the insulating layer with the priming beam to a lower positive potential to leave a residual reverse bias on the PN-junctions and form a storage layer for minority carriers adjacent each junction, optical imaging means adapted to expose the side of the target opposite to the first side with an optical image to create minority carriers in the semiconductor body and to store them in the storage layer in a pattern of the optical image, a charge pattern fixing means including means for biasing the insulating layer with a fixing electron beam to the lower positive potential and a timing means operative to permit sufficient dark current to flow to annihilate substantially the storage layer whereby an isolated charge pattern is formed on the insulating layer which is a replica of the charge pattern of the storage layer and the target is rendered insensitive to photons, reading means operative after the operation of the timing means for scanning the target with a reading electron beam to generate an electrical signal in accordance with the charge pattern on the insulating layer, and an inverter for reversing the instantaneous polarity of the electrical signal.

8. A video pickup system for converting optical images to video signals including in combination an image storage tube comprising a target having a semiconductor body of one conductivity type, an array of discrete regions of the opposite conductivity type formed into a first side of the semiconductor body to form an array of PN-junctions, an insulating layer formed on the first side of the semiconductor body, the insulating layer having an array of regions of reduced thickness over the discrete regions, and electron beam forming and scanning means, the combination further including means for biasing the insulating layer with a priming electron beam to a positive potential and then for biasing the insulating layer with the priming beam to a lower positive potential to leave a residual reverse bias on the PN-junctions and form a storage layer for minority carriers adjacent each junction, optical imaging means adapted to expose a second side of the target opposite to the first side with an optical image to create minority carriers in the semiconductor body and to store them in the storage layer in a pattern of the optical image, a charge pattern fixing means including means for biasing the insulating layer with a fixing electron beam to the lower positive potential and means for saturating the second side of the target with light to annihilate substantially the storage layer whereby an isolated charge pattern is formed on the insulating layer which is a replica of the charge pattern of the storage layer and the target is rendered insensitive to photons, reading means for scanning the target with a reading electron beam to generate an electrical signal in accordance with the charge pattern on the insulating layer, and an inverter for reversing the instantaneous polarity of the electrical signal.

9. A video pickup system for converting optical images to video signals including an image storage tube comprising an evacuated envelope, at least one electron beam forming means situated in the envelope, a target in the envelope placed to be exposed on one side to an electron beam, the target comprising a semiconductor body in which hole-electron pairs are generated by absorption of photons, and an insulating layer of uniform thickness covering the surface of the semiconductor body on the electron beam side of the target, the combination further including means for biasing the surface of the insulating layer to a potential of a first magnitude and then for biasing the surface of the insulating layer to a potential of a second lower magnitude to form a uniform minority charge storage region in the semiconductor body, optical imaging means for focusing an optical image on the target on the side thereof remote from the electron beam side, means operative simultaneously with the optical imaging means for exposing the entire surface of the insulating layer to a fixing electron beam, and means for scanning the insulating layer with a reading electron beam to generate an electrical signal in accordance with the charge pattern stored on the insulating layer.

10. The system of claim 9 wherein the means for exposing the entire surface of the insulating layer to the fixing electron beam comprises an electron flood gun.

11. The stem of claim 9 in which the semiconductor body is silicon and the insulating layer is silicon dioxide.

12. A method of operating a video pickup system of the type in which a charge storage target having an insulating surface is exposed on said surface to an electron beam and hole-electron pairs are generated in the target upon photon absorption of an optical image, said method comprising the steps of biasing said surface of the target to a potential of a first magnitude and then biasing said surface to a potential of a second lower magnitude to form a storage region thereunder, focusing an optical image on the target on the side thereof remote from said surface to store minority charge carriers in the storage region in a pattern of the optical image, fixing an isolated charge pattern on said surface which is a replica of the charge pattern of the storage region, the fixing step including the steps of again biasing said surface to the lower potential and annihilating the storage region in the target whereby the target is rendered insensitive to photons, and reading the charge pattern stored on said surface, the reading step including the step of scanning said surface with a reading electron beam to generate an electrical signal in accordance with the charge pattern stored thereon.

13. A method of operating a video pickup system of the type in which a semiconductor target having an insulating surface covering an array of PN-junctions is exposed on said surface to an electron beam, said method comprising the steps of biasing said surface to a potential of a first magnitude and then biasing said surface to a potential of a second lower magnitude to leave a residual reverse bias on the PN-junctions and form a storage layer for minority charge carriers adjacent each junction, exposing the side of the target opposite to said surface with an optical image to create minority carriers in the target and to store them in the storage layer in a pattern of the optical image, fixing an isolated charge pattern on said surface which is a replica of the charge pattern of the storage layer, the fixing step including the steps of again biasing said surface to the lower potential and annihilating the storage layer whereby the target is rendered insensitive to photons, and reading the charge pattern stored on said surface, the reading step including the step of scanning said surface with a reading electron beam to generate an electrical signal in accordance with the charge pattern stored thereon.

14. A method of operating a video pickup system of the type in which a semiconductor target having an insulating surface covering an array of PN-junctions is exposed on said surface to an electron beam, said method comprising the steps of biasing said surface with a priming electron beam to a positive potential and then biasing said surface with the priming beam to a lower positive potential to leave a residual reverse bias on the PN-junctions and form a storage layer for minority carriers adjacent each junction, exposing the side of the target opposite to said surface with an optical image to create minority carriers in the target and to store them in the storage layer in a pattern of the optical image, fixing an isolated charge pattern on said surface which is a replica of the charge pattern of the storage layer, the fixing step including the steps of biasing said surface with a fixing electron beam to the lower potential and permitting sufficient dark current to flow to annihilate substantially the storage layer whereby the target is rendered insensitive to photons, reading the charge pattern stored on said surface, the reading step including the step of scanning said surface with a reading electron beam to generate an electrical signal in accordance with the charge pattern stored thereon, and reversing the instantaneous polarity of the electrical signal.

15. A method of operating a video pickup system of the type in which a semiconductor target having an insulating surface covering an array of PN-junctions is exposed on said surface to an electron beam, said method comprising the steps of biasing said surface with a priming electron beam to a positive potential and then biasing said surface with the priming beam to a lower positive potential to leave a residual reverse bias on the PN-junctions and form a storage layer for minority carriers adjacent each junction, exposing a second side of the target opposite to said surface with an optical image to create minority carriers in the target and to store them in the storage layer in a pattern of the optical image, fixing an isolated charge pattern on said surface which is a replica of the charge pattern of the storage layer, the fixing step including the steps of biasing said surface with a fixing electron beam to the lower potential and saturating the second side of the target with light to annihilate substantially the storage layer whereby the target is rendered insensitive to photons, reading the charge pattern stored on said surface, the reading step including the step of scanning said surface with a reading electron beam to generate an electrical signal in accordance with the charge pattern stored thereon, and reversing the instantaneous polarity of the electrical signal.

16. A method of operating a video pickup system of the type in which a charge storage target having an insulating surface is exposed on said surface to an electron beam and hole-electron pairs are generated in the target by the absorption of photons, said method comprising the steps of biasing said surface to a potential of a first magnitude and then biasing said surface to a potential of a second lower magnitude to form a uniform minority charge storage region in the semiconductor body, focusing an optical image on the target on the side thereof remote from said surface and exposing the entire area of said surface to a fixing electron beam, the focusing step and the exposing step taken concurrently, scanning said surface with a reading electron beam to generate an electrical signal in accordance with the charge pattern stored thereon, and detecting the electrical signal as video output.

* * * * *